US009702458B2

(12) United States Patent
Storer et al.

(10) Patent No.: US 9,702,458 B2
(45) Date of Patent: Jul. 11, 2017

(54) PRESSURE AND SPEED CONTROL FOR A VEHICLE

(71) Applicant: Caterpillar Inc., Peoria, IL (US)

(72) Inventors: Corwin Storer, Bartonville, IL (US); Sudarshan Maiyur, Cary, NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/960,749

(22) Filed: Dec. 7, 2015

(65) Prior Publication Data
US 2017/0159811 A1    Jun. 8, 2017

(51) Int. Cl.
| | |
|---|---|
| *F16H 61/47* | (2010.01) |
| *F16H 47/02* | (2006.01) |
| *F16H 61/4008* | (2010.01) |
| *F16H 61/42* | (2010.01) |
| *E02F 3/76* | (2006.01) |
| *F16H 61/44* | (2006.01) |
| *B60K 17/356* | (2006.01) |

(52) U.S. Cl.
CPC .......... *F16H 61/47* (2013.01); *B60K 17/356* (2013.01); *E02F 3/7636* (2013.01); *F16H 47/02* (2013.01); *F16H 61/4008* (2013.01); *F16H 61/42* (2013.01); *F16H 61/44* (2013.01); *F16H 2047/025* (2013.01)

(58) Field of Classification Search
CPC ...... F16H 61/47; F16H 61/4008; F16H 61/42; F16H 61/44; F16H 47/02; F16H 2047/025; E02F 3/7636; B60K 17/356; B60K 17/0015
See application file for complete search history.

(56) References Cited

U.S. PATENT DOCUMENTS

| | | | |
|---|---|---|---|
| 4,177,870 A | 12/1979 | Henn | |
| 4,183,419 A * | 1/1980 | Henn | B60K 17/356 180/14.3 |
| 4,444,286 A | 4/1984 | Hawkins et al. | |
| 4,635,743 A * | 1/1987 | Riehl | B60K 23/08 180/243 |
| 5,147,010 A | 9/1992 | Olson et al. | |
| 5,361,208 A | 11/1994 | Olson et al. | |
| 5,564,519 A | 10/1996 | Katoh et al. | |
| 6,508,328 B1 | 1/2003 | Kenyon et al. | |

(Continued)

FOREIGN PATENT DOCUMENTS

| | | |
|---|---|---|
| JP | 63258223 | 10/1988 |
| JP | 06156104 A | 6/1994 |
| JP | 08230501 | 9/1996 |

*Primary Examiner* — Michael J Zanelli
(74) *Attorney, Agent, or Firm* — James S. Bennin

(57) ABSTRACT

A system and method configured to select a control configuration for a hydraulic fluid system. The system includes a controller having at least one sensor and a processor. The controller is configured to sense a feed pressure and a return pressure of a fluid within the hydraulic fluid system and a speed of a driven set of wheels and a speed of an idle set of wheels. The driven set of wheels are drivingly coupled to an engine, and the idle set of wheels are drivingly coupled to the hydraulic fluid system. The controller is further configured to select a control configuration for the hydraulic fluid system based on a ratio between the feed pressure and the return pressure, and further based on a ratio between the speed of the driven set of wheels and the speed of the idle set of wheels.

20 Claims, 4 Drawing Sheets

(56) References Cited

U.S. PATENT DOCUMENTS

| | | |
|---|---|---|
| 6,644,429 B2 | 11/2003 | Evans et al. |
| 7,044,257 B2 | 5/2006 | Kempf et al. |
| 8,051,916 B2 | 11/2011 | Bright et al. |
| 2001/0001187 A1 | 5/2001 | Yano et al. |
| 2010/0044060 A1 | 2/2010 | Shiohara et al. |
| 2013/0013158 A1 | 1/2013 | Weber et al. |
| 2015/0283892 A1* | 10/2015 | Larsson .................. B60K 6/12 180/243 |

* cited by examiner

PRESSURE AND SPEED CONTROL FOR A VEHICLE

TECHNICAL FIELD

This disclosure relates generally to a work machine, and more particularly, to a system and method configured to control the pressure and speed of various components of the work machine during operation.

BACKGROUND

Work machines are used to perform many different applications in the areas of construction, agriculture, landscaping, and mining. Some work machines are all-wheel drive machines that include hydraulic motors to drive either the front or rear wheels. The hydraulically driven wheels may be driven in an overdrive mode, where they are driven at a faster speed than the non-hydraulically driven wheels; at an equal speed mode where they are driven at the same speed as the non-hydraulically driven wheels; or in an underdrive mode, where they are driven slower than the non-hydraulically driven wheels.

Current all-wheel drive work machines may control the speed of hydraulically driven wheels using a clutch. Japanese Patent No. 2,544,694 B2 describes a truck having a four-wheel drive in combination with hydraulically driven wheels. Each of the hydraulically driven wheels is coupled to a motor via a clutch, which is used to control the speed of the hydraulically driven wheels. Therefore, multiple clutches may be required depending on the number of hydraulically driven wheels. Each clutch can increase the cost and the complexity of the work machine. Additionally, each clutch can become damaged during a work machine operation resulting in a hydraulically driven wheel speed that is inconsistent with operator commands.

Thus, an improved system for controlling the speed of a work machine is desired.

SUMMARY

An aspect of the present disclosure provides a controller for facilitating control of a work machine. The controller includes a first sensor, a second sensor, a third sensor, a fourth sensor, and a processor. The first sensor is configured to sense a speed of a first set of wheels which are coupled to an engine such that power output from the engine rotates the first set of wheels. The second sensor is configured to sense a feed pressure of a fluid within a first conduit. The first conduit connects an output from a fluid pump to an input to at least one motor. The at least one motor is coupled to a second set of wheels such that power output from the at least one motor rotates the second set of wheels. The third sensor is configured to sense a return pressure of the fluid within a second conduit. The second conduit connects an output of the at least one motor to an input of the fluid pump. The fourth sensor is configured to sense a speed of the second set of wheels. The processor is configured to select one of a plurality of control configurations for the fluid pump based on a ratio between the feed pressure and the return pressure, and further based on a ratio between the speed of the first set of wheels and the speed of the second set of wheels.

Another aspect of the present disclosure provides a method for controlling the speed of a vehicle. The method includes: sensing a speed of a first set of wheels, sensing a feed pressure within a first conduit, sensing a return pressure of a fluid within a second conduit, sensing a speed of a second set of wheels, and selection a control configuration. The first set of wheels is coupled to an engine such that power output from the engine rotates the first set of wheels. The first conduit connects an output from a fluid pump to an input to an at least one motor. The second conduit connects an output of the at least one motor to an input to the fluid pump. The at least one motor is coupled to the second set of wheels such that power output from the at least one motor rotates the second set of wheels. The selection of the control configuration is based on a ratio between the feed pressure and the return pressure, and further based on a ratio between the speed of the first set of wheels and the speed of the second set of wheels.

Another aspect of the present disclosure provides a machine. The machine includes an engine, a first set of wheels, a fluid pump, at least one motor, a second set of wheels, and a controller. The first set of wheels is coupled to an output of the engine such that power output from the engine rotates the first set of wheels. The fluid pump is coupled to the output of the engine. The at least one motor is coupled to the fluid pump by a first conduit and a second conduit. The first conduit connects an output from the fluid pump to an input to the at least one motor, and the second conduit connects an output of the at least one motor to an input to the fluid pump. The second set of wheels is coupled to the at least one motor such that power output from the at least one motor rotates the second set of wheels.

The controller is configured to generate an output signal indicative of a control configuration to the fluid pump. The controller includes a first sensor, a second sensor, a third sensor, a fourth sensor, and a processor. The first sensor is configured to sense a speed of the first set of wheels. The second sensor is configured to sense a feed pressure of a fluid within the first conduit. The third sensor is configured to sense a return pressure of the fluid within a second conduit. The fourth sensor is configured to sense a speed of the second set of wheels. The processor is configured to determine the control configuration for the fluid pump based on a ratio between the feed pressure and the return pressure, and further based on a ratio between the speed of the first set of wheels and the speed of the second set of wheels.

DETAILED DESCRIPTION

The disclosure relates generally to a work machine having a driven set of wheels and an idle set of wheels. The driven set of wheels are powered by an engine, and the idle set of wheels are powered by the engine through a hydraulic drive assembly. A controller may sense a wheel speed of the driven set of wheels, a wheel speed of the idle set of wheels, a feed pressure of a fluid within the hydraulic drive assembly, and a return pressure of a fluid within the hydraulic drive assembly. Based on each of the sensed parameters, the controller may set a control configuration for the hydraulic drive assembly to account for slippage, drag, or other aspects of the operation of the work machine that may impact performance.

Figure 1:
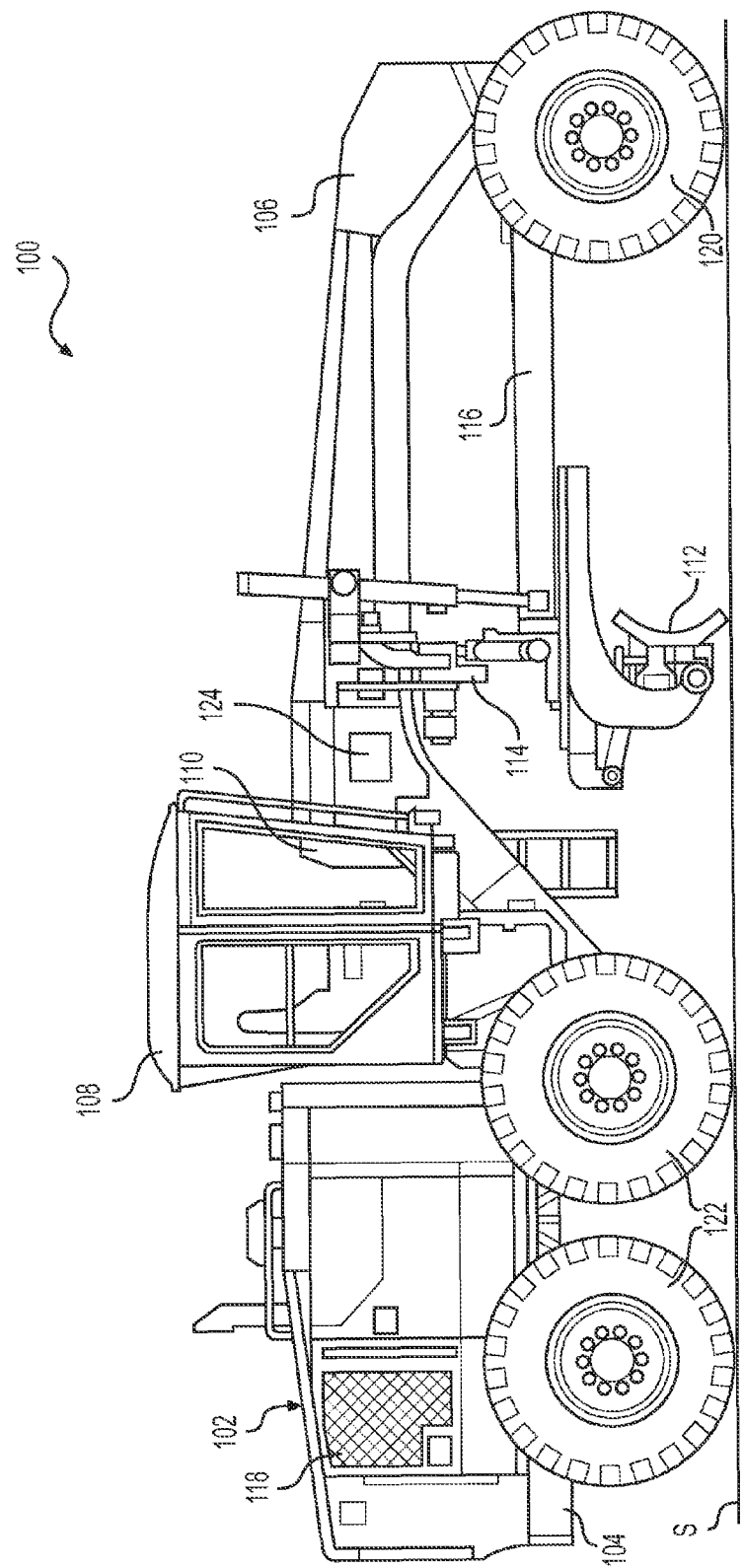
FIG. 1 is a schematic view of a work machine, according to an aspect of this disclosure.

FIG. 1 illustrates a machine 100, according to one aspect of the disclosure. The machine 100 may be a motor grader 102, as shown, or any other on-highway or off-highway vehicle used to perform work operations. The motor grader 102 generally includes a two-piece frame made up of an engine frame 104 and an implement portion 106. Alternatively, the motor grader 102 may include a single frame piece. The engine frame 104, in the illustrated aspect, is connected to the implement portion 106 by a pivot (not shown), such that the engine frame 104 and the implement portion 106 inter-operatively connect and associate the various physical and structural features that enable the motor grader 102 to function. These features may include an operator cab 108 that is mounted on top of the implement portion 106, from which an operator may control and direct operation of the motor grader 102. Additionally, a steering apparatus 110 and similar controls may be located within the operator cab 108.

The motor grader 102 includes a shovel or blade 112, and the blade 112 is carried by the implement portion 106, for example at a mid-portion. The blade 112 can be selectively adjusted to engage a surface S at various heights and angles to achieve a desired grade or contour while the motor grader 102 operates. Adjustment of the position of the blade 112 is accomplished by a system of actuators 114, while support for the loading experienced by the blade 112 during operation is accomplished by a bar 116, which may pivotally connect the implement portion 106 to the blade 112.

A drive system 118 is configured to generate power to physically move the motor grader 102 over the surface S. The drive system 118 may be mounted to the frame 104. The implement portion 106 includes two idle wheels 120 (only one visible) that are configured to enable motion of the motion grader 102. The two idle wheels 120 contact the surface S, and the engine frame 104 contacts the surface S through a number of drive wheels 122, for example four, (only two visible). The drive system 118 may also provide power to operate various actuators and systems of the motor grader 102. Alternative aspects of the motor grader 102 may include different configurations and/or other various implements associated therewith.

The motor grader 102 may include a controller 124 configured to facilitate control and coordination of the motor grader 102. The controller 124 may be used to facilitate control and coordination of any methods or procedures described herein. The controller 124 may be an electronic control unit, system computer, central processing unit, or other data storage manipulation device that may be used to facilitate control and coordination and to assess various components of the motor grader 102. While the controller 124 is represented as a single unit coupled to the implement portion 106, in other aspects the controller 124 may be distributed as a plurality of distinct but interoperating units, incorporated into another component, or located at different locations on or off the motor grader 102.

Figure 2:
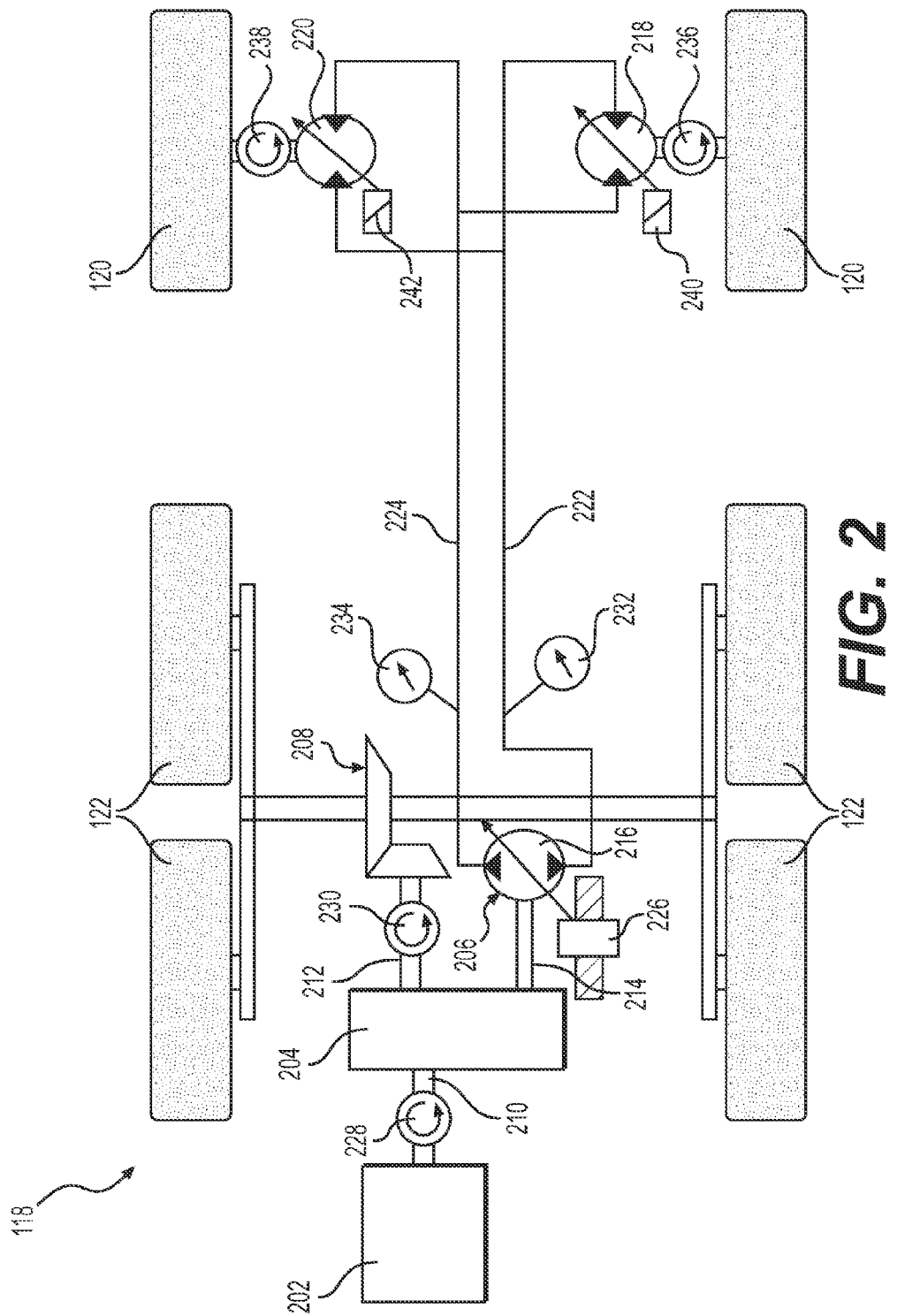
FIG. 2 is a schematic view of a drive system, according to an aspect of this disclosure.

FIG. 2 illustrates a schematic of the drive system 118, according to an aspect of this disclosure. The drive system 118 includes an engine 202, a transmission 204, a hydraulic drive assembly 206, and drive gears 208. The engine 202 is mechanically connected to the four drive wheels 122 via the transmission 204 and the drive gears 208, and the engine 202 is mechanically connected to the two idle wheels 120 via the hydraulic drive assembly 206. The engine 202 has a gas supply system (not shown) that may include a diesel fuel supply, a gaseous fuel supply, a natural gas fuel supply, a duel fuel supply, or other fuel supply system commonly known in the art. It will be appreciated that fewer or more components may be incorporated into the drive system 118.

The engine 202 produces energy that may be in the form of mechanical energy produced by an engine rotating shaft 210. The energy is transferred to and modified by the transmission 204. The transmission 204 provides the modified energy to both the drive gears 208 and the hydraulic drive assembly 206 by a gear rotating shaft 212 and a hydraulic rotating shaft 214, respectively. The drive gears 208 provide the energy to rotate the drive wheels 122 and the hydraulic drive assembly 206 provides the energy to rotate the idle wheels 120.

The hydraulic drive assembly 206 includes a hydraulic pump 216, a first hydraulic motor 218, and a second hydraulic motor 220. The hydraulic pump 216 is mechanically coupled to the transmission 204 via the hydraulic rotating shaft 214. The hydraulic pump 216 is fluidly coupled to both the first hydraulic motor 218 and the second hydraulic motor 220 via the input hydraulic conduit 222 and the output hydraulic conduit 224. The first hydraulic motor 218 and the second hydraulic motor 220 are each mechanically coupled to one of the two idle wheels 120.

The hydraulic pump 216 is configured to pump a fluid, such as a hydraulic fluid, to the first hydraulic motor 218 and the second hydraulic motor 220 via the input hydraulic conduit 222. The hydraulic pump 216 is powered by the energy provided by the transmission 204. The hydraulic pump 216 converts the energy into a fluid pressure which is provided to each of the hydraulic motors 218 and 220. The fluid pressure is converted into mechanical power, such as torque and angular displacement, by the first and second hydraulic motors 218 and 220, which is used to rotate each respective idle wheel 120. After the fluid flows through each of the first and second hydraulic motors 218 and 220, the fluid returns to the hydraulic pump 216 via the output hydraulic conduit 224.

The hydraulic pump 216 may include a pump actuator 226, a variable swash plate (not shown), a plurality of pump pistons (not shown), or other components commonly used in a hydraulic pump 216. The plurality of pump pistons may be in sliding contact with the variable swash plate. The pump actuator 226 may be operatively coupled to the variable swash plate, and configured to actuate the variable swash plate by changing the position of the swash plate, for example, from a first angle to a second angle. The change in angle of the variable swash plate defines a displacement of the hydraulic pump 216. The displacement of the hydraulic pump 216 determines an amount of force the pump pistons provide to the fluid within the input hydraulic conduit 222. For example, the hydraulic rotating shaft 214 provides a rotational force to each of the plurality of pistons. Based on the displacement of the hydraulic pump 216, the plurality of pistons may convert the rotational force into a fluid pressure to change the pressure of the fluid within the input hydraulic conduit 222.

The first hydraulic motor 218 and the second hydraulic motor 220 may include a first motor actuator 240 and a second motor actuator 242, respectively. Each of the first and second hydraulic motors 218 and 220 may also include a variable swash plate (not shown), a plurality of pump pistons (not shown), or other components commonly used in a hydraulic motors 218 and 220. The first and second hydraulic motors 218 and 220 may perform in a manner similar to the hydraulic pump 216, but instead of converting mechanical power into fluid pressure, the first and second hydraulic motors 218 and 220 are configured to convert fluid pressure into mechanical power. In an aspect of this disclosure, the first hydraulic motor 218 and the second hydraulic motor 220 may be two speed motors, variable displacement motors, a fixed displacement motor, combinations thereof, or still other hydraulic motors known and used in the art.

The drive system 118 further includes an engine speed sensor 228, a transmission speed sensor 230, an input pressure sensor 232, an output pressure sensor 234, a first wheel speed sensor 236, and a second wheel speed sensor 238. Each of the sensors may include a signal transducer configured to sense a transmitted signal, or component of a transmitted signal. In alternative aspects, fewer of more sensors and/or actuators may be coupled to the drive system 118 for use in controlling the drive system 118.

The engine speed sensor 228 and the transmission speed sensor 230 may be coupled to the engine rotating shaft 210 and the gear rotating shaft 212, respectively. Each speed sensor 228 and 230 may be configured to sense a speed of the corresponding shaft 210 and 212. Each speed sensor 228 and 230 may further be configured to sense load, timing data, and/or other data related to the operation of the engine 202 and transmission 204.

The input pressure sensor 232 and the output pressure sensor 234 may be coupled to the input hydraulic conduit 222 and the output hydraulic conduit 224, respectively. The input pressure sensor 232 may be configured to sense a feed pressure of the fluid within the input hydraulic conduit 222, and the output pressure sensor 234 may be configured to sense a return pressure of the fluid within the output hydraulic conduit 224. It will be appreciated that each sensor 232 and 234 may be configured to sense additional parameters, such as, fluid temperature, fluid flow rate, or still other parameters.

The first wheel speed sensor 236 and the second wheel speed sensor 238 may be operatively coupled to the first hydraulic motor 218 and the second hydraulic motor 220, respectively. Each wheel speed sensor 236 and 238 may be configured to sense an output speed of each corresponding motor 218 and 220 being applied to the two idle wheels 120. Each wheel speed sensor 236 and 238 may further be configured to sense load, timing data, and/or other data related to the operation of the first and second hydraulic motors 218 and 220.

Figure 3:
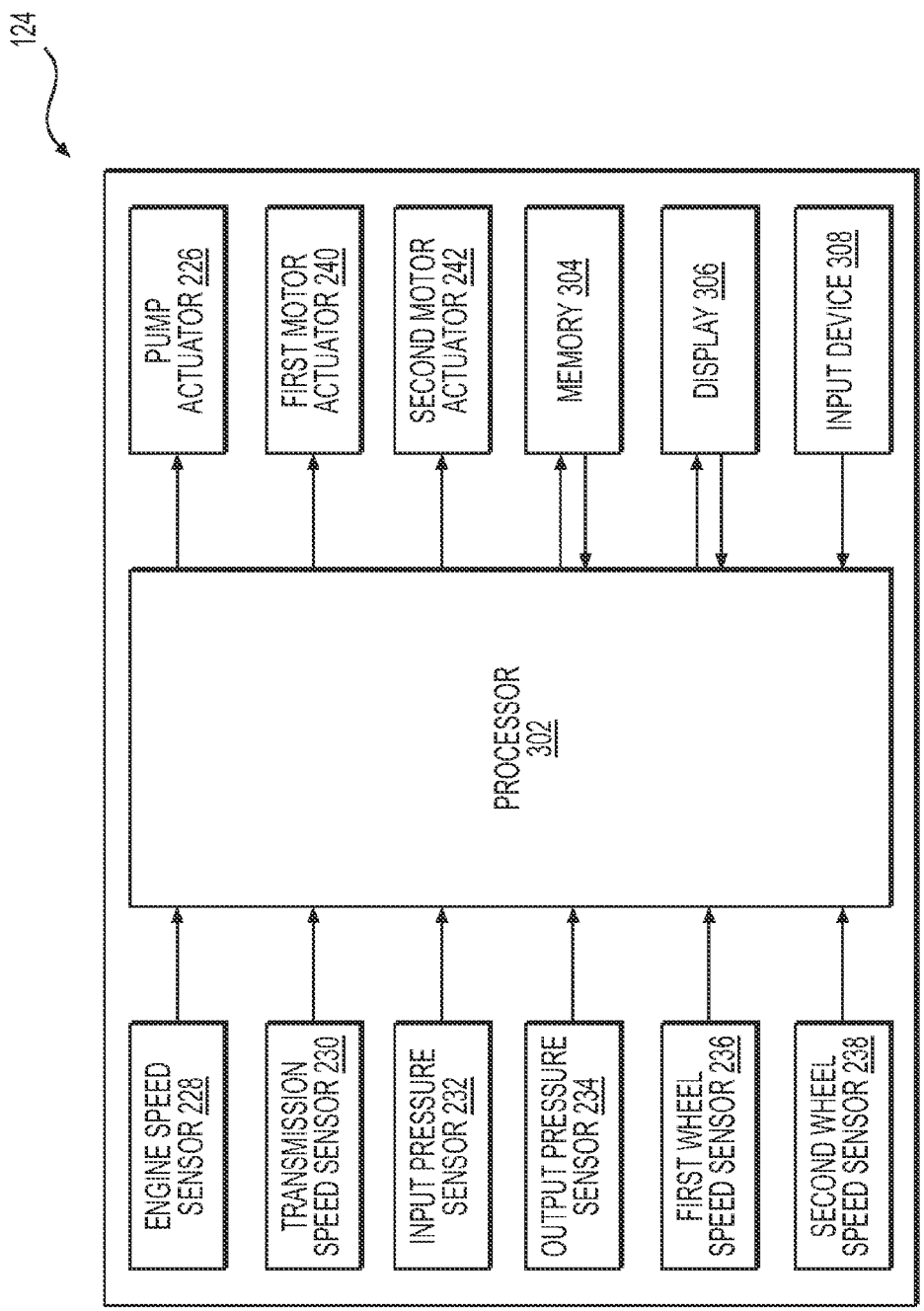
FIG. 3 is a schematic view of a controller, according to an aspect of this disclosure.

FIG. 3 illustrates a schematic of the controller 124, according to an aspect of this disclosure. In this aspect, the controller 124 includes each sensor and actuator located on the disclosed motor grader 102. The controller 124 also includes a data processor 302, a memory 304, a display 306, and an input device 308.

The data processor 302 may be coupled to each of the sensors, the memory 304, the display 306, and the input device 308. The processor 302 may be configured to calculate, determine, and/or select various operating parameters of the motor grader 102 in response to inputs from the sensors, as further described herein. Action may be taken in response to the data, including modifying the fluid pressure within the hydraulic drive assembly 206, modifying an engine speed, commencing an operation, or still other responses. Examples of processors include computing devices and/or dedicated hardware as defined herein, but are not limited to, one or more central processing units and microprocessors.

The memory 304 may include random access memory (RAM), read-only memory (ROM), or both. The memory 304 may store computer executable code including, for example, at least one algorithm for calculating drive system 118 operating parameters and at least one algorithm for selecting a control configuration for the hydraulic fluid pump 216. The memory 304 may also store data and information, as described herein, which may be provided to the processor 302 when calculating the drive system 118 operating parameters, including data received from each of the sensors.

The display 306 may be located on the motor grader 102, remotely from the motor grader 102, or combinations thereof, and configured to display various data to an operator relating to the temperature, pressure, flow rate, or still other parameters of the drive system 118. The display 306 may include, but is not limited to, cathode ray tubes (CRT), light-emitting diode display (LED), liquid crystal display (LCD), organic light-emitting diode display (OLED), or a plasma display panel (PDP). Such displays can also be touchscreens and may incorporate aspects of the input device 308. The display 306 may also include a transceiver that communicates over a communication channel.

Referring to FIGS. 1 through 3, during operation of the motor grader 102, energy is produced by the engine 202 and transferred to the idle wheels 120 and the drive wheels 122, as described above. The transferred energy produces a speed of the idle wheels 120 and a speed of the drive wheels 122. Depending on the work application being performed, the speed of the idle wheels 120 and the speed of the drive wheels 122 may be different. For example, during an operation which requires a significant force to be applied by the motor grader 102, such as the blade 112 engaging a significant amount of ground material, the speed of the drive wheels 122 may be greater than the speed of the idle wheels 120. Conversely, the speed of the idle wheels 120 may be greater than the speed of the drive wheels 122 when the motor grader 102 is not engaged in performing a grading operation or other operation requiring significant force.

The difference in speed between the idle wheels 120 and the drive wheels 122 may produce at least two different situations. A first situation being when the speed of the drive wheels 122 is greater than the speed of the idle wheels 120. Since the speed of the idle wheels 120 is less than the speed of the drive wheels 122, the idle wheels 120 may produce a drag force on the motor grader 102. The drag force produced by each idle wheel 120 may drive the first and second hydraulic motors 218, causing the pressure of the fluid within the output hydraulic conduit 224 to increase.

A second situation may occur when the speed of the idle wheels 120 is greater than the speed of the drive wheels 122. Since the speed of the idle wheels 120 is greater than the speed of the drive wheels 122, a slippage may occur, such that the idle wheels 120 may rotate at a greater speed than a speed of the motor grader 102. Drag and slippage conditions may increase vehicle wear, thereby decreasing the expected life of the motor grader 102, cause unintended movement of the motor grader 102, such as movement of the vehicle contrary to operator control, or cause other conditions that could affect the performance of the motor grader 102.

The controller 124 may be configured to control the operation of the hydraulic drive assembly 206 to avoid or minimize the occurrence of a drag or slip condition. In an aspect of this disclosure, the processor 302 utilizes values sensed by each of the sensors to select a control configuration for the fluid pump 216 using algorithms and other data or information stored in memory 304. The data and information stored in memory 304 may include physical parameters of the components of the motor grader 102, properties of the fluid within the hydraulic drive assembly 206, predetermined values (i.e. determined prior to operation of the motor grader 102), or other relevant information for controlling the operation of the hydraulic drive assembly 206. The data or information stored in memory 304 may be adjusted by an operator through the input device 308.

The predetermined values stored in memory 304 may include, for example, a predetermined speed ratio and a predetermined pressure ratio. The predetermined speed ratio may include a desired speed ratio between the speed of the drive wheels 122 and the speed of the idle wheels 120. The predetermined pressure ratio may include a ratio between the pressure of the fluid within the input hydraulic conduit 222 and the pressure of the fluid within the output hydraulic conduit 224. In an alternative aspect, the memory 304 may further store a predetermined pressure delta. The predetermined pressure delta may include a pressure value representing a difference between the pressure of the fluid within the input hydraulic conduit 222 and the pressure of the fluid within the output hydraulic conduit 224.

The control configuration of the fluid pump 216 may include at least a first control or pressure control configuration, a second control or speed control configuration, and a third control or neutral control configuration. In the first control configuration, the processor 302 may generate an output signal to control the fluid pump 216, via the pump actuator 226, to increase the pressure of the fluid within the input hydraulic conduit 222. In the second control configuration, the processor 302 may generate an output signal to control the fluid pump 216, via the pump actuator 226, to decrease the pressure of the fluid within the input hydraulic conduit 222. In the third control configuration, the processor 302 may generate an output signal to control the fluid pump 216, via the pump actuator 226, to maintain the current pressure of the fluid within the input hydraulic conduit 222. In alternative aspect, other control configurations may be utilized to control, for example, the first hydraulic motor 218 and the second hydraulic motor 220.

The processor 302 may select a control configuration based on at least an input from the input pressure sensor 232 and the output pressure sensor 234. For example, if the ratio between the pressure of the fluid within the input hydraulic conduit 222 and the pressure of the fluid within the output hydraulic conduit 224 is less than the predetermined pressure ratio, then the processor 302 may select the first control configuration. Alternatively, if the difference between the pressure of the fluid within the input hydraulic conduit 222 and the pressure of the fluid within the output hydraulic conduit 224 is less than a predetermine pressure delta then the processor 302 may select the first control configuration. The first control configuration would increase the pressure of the fluid within the input hydraulic conduit 222. The pressure may be increased until the ratio or the difference between the pressure of the fluid within the input hydraulic conduit 222 and the pressure of the fluid within the output hydraulic conduit 224 meets or exceeds the predetermined pressure ratio or the predetermined pressure delta, respectively. Thereafter, the processor 302 may select the third control configuration to maintain the current pressure of the fluid within the input hydraulic conduit 222.

Another example of the processor 302 selecting a control configuration may include a selection based on input from at least the transmission speed sensor 230 and the first wheel speed sensor 236 or the second wheel speed sensor 238. For example, if the ratio between the speed of the drive wheels 122 and the speed of the idle wheels 120 is less than the predetermined speed ratio, then the processor 302 may select the second control configuration. This would decrease the pressure of the fluid within the input hydraulic conduit 222. The pressure may be decreased until the ratio between the speed of the drive wheels 122 and the speed of the idle wheels 120 meets or exceeds the predetermined speed ratio. Thereafter, the processor 302 may select the third control configuration to maintain the current pressure of the fluid within the input hydraulic conduit 222.

In an aspect of this disclosure, the predetermined pressure ratio may be greater than 1.0. Therefore, if the pressure of the fluid within the input hydraulic conduit 222 is less than the pressure of the fluid within the output hydraulic conduit 224, then the first control configuration is selected by the processor 302 and the pressure within the input hydraulic conduit 222 is increased.

In an aspect of this disclosure, the predetermined speed ratio may be greater than 1.0. Therefore, if the speed of the drive wheels 122 is less than the speed of the idle wheels 120, then the second control configuration is selected by the processor 302 and the pressure within the input hydraulic conduit 222 is decreased.

INDUSTRIAL APPLICABILITY

Figure 4:
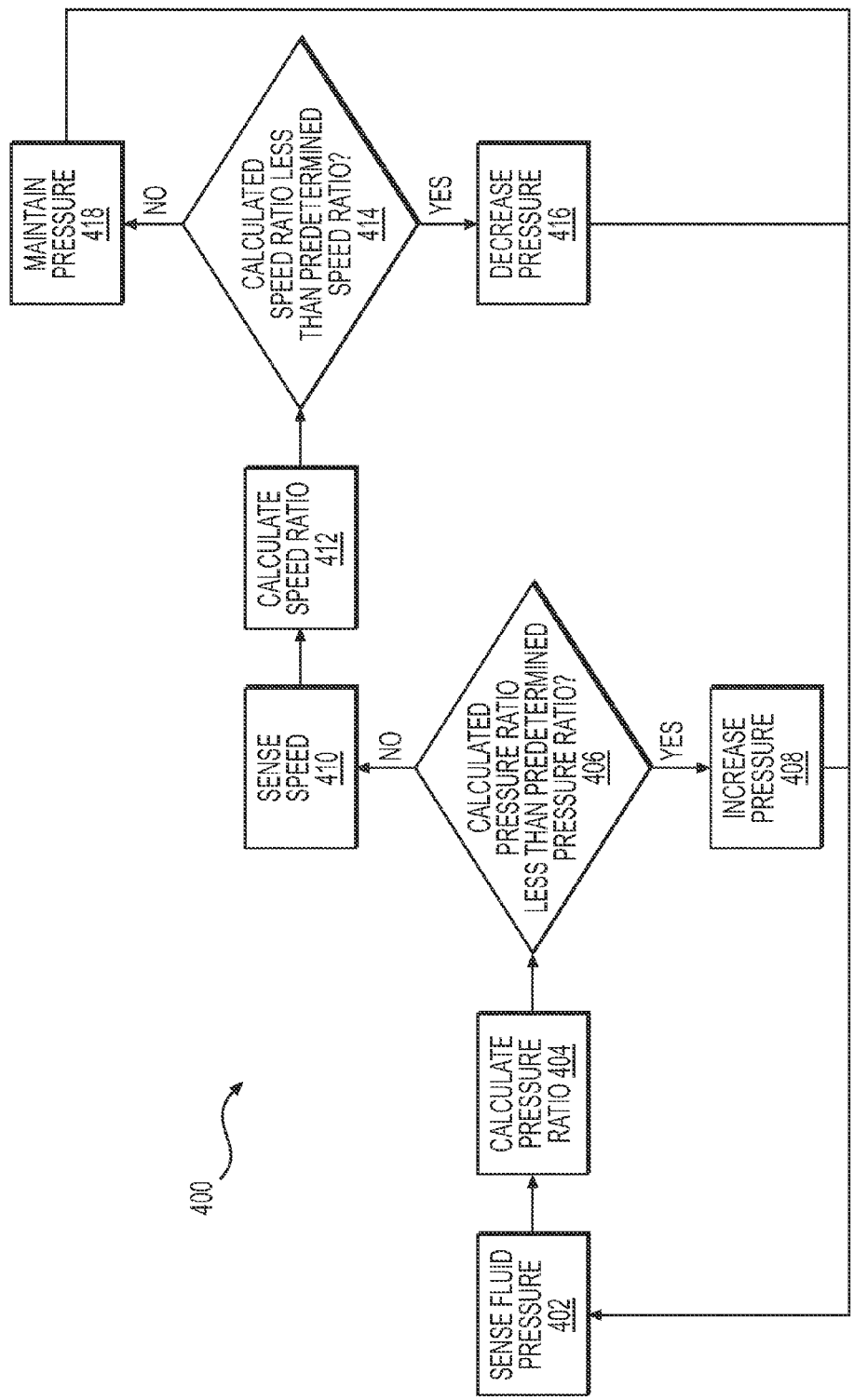
FIG. 4 is a schematic of a control flow diagram, according to an aspect of this disclosure.

FIG. 4 illustrates a control flow diagram 400 used by the controller 124 to control the drive system 118, according to an aspect of this disclosure. A control algorithm configured to perform each of the blocks of the control flow diagram 400 may be stored in memory 304 and implemented by the processor 302. The control algorithm may employ a closed loop integral control with a feed forward command of the predetermined speed ratio. The input to an integrator may be determined by the predetermined pressure ratio. Each of the blocks may be performed during the operation of the motor grader 102.

At block 402, the controller 124 may sense the fluid pressure within the input hydraulic conduit 222 and the output hydraulic conduit 224 via the input pressure sensor 232 and the output pressure sensor 234, respectively. At block 404, a calculated pressure ratio between the fluid pressure within the input hydraulic conduit 222 and the fluid pressure within the output hydraulic conduit 224 may be computed. The sensed fluid pressures in the input hydraulic conduit 222 and the output hydraulic conduit 224 and the calculated pressure ratio may be stored in memory 304.

At block 406, the calculated pressure ratio from block 404 is compared to the predetermined pressure ratio. If the calculated pressure ratio is determined to be below the predetermined pressure ratio, the processor 302 continues to block 408. At block 408, the processor 302 may select the first control configuration, which increases the fluid pressure within the input hydraulic conduit 222. After the first control configuration has been selected, the processor 302 may repeat blocks 402, 404, and 406.

If the calculated pressure ratio is above the predetermined pressure ratio, the processor 302 continues to block 410. At block 410, the speed of the drive wheels 122 is sensed via the transmission speed sensor 230, and the speed of the idle wheels 120 is sensed via the first wheel speed sensor 236 and the second wheel speed sensor 238. At block 412, a calculated speed ratio between the speed of the drive wheels 122 and the speed of the idle wheels 120 may be computed. The sensed wheel speeds and the calculated speed ratio may be stored in memory 304.

At block 414, the calculated speed ratio from block 412 is compared to the predetermined speed ratio. If the calculated speed ratio is determined to be below the predetermined speed ratio, the processor 302 continues to block 416.

At block 416, the processor 302 may select the second control configuration, which decreases the fluid pressure within the input hydraulic conduit 222. After the second control configuration has been selected, the processor 302 may return to block 402.

If the calculated speed ratio is above the predetermined speed ratio, the processor 302 continues to block 418. At block 418, the processor 302 may select the third control configuration, which maintains the current fluid pressure within the input hydraulic conduit 222. After the third control configuration has been selected, the processor 302 may return to block 402.

Referring to FIGS. 1 to 4, the present disclosure provides a system and method for controlling a machine 100, such as a motor grader 102. The motor grader 102 includes a controller 124 and a drive system 118 which has a hydraulic drive assembly 206. The controller 124 uses data stored in memory 304, such as a predetermined pressure ratio and a predetermined speed ratio, data from the sensors, data input by an operator, engine control parameters, or other information, to control the motor grader 102.

The controller 124 facilitates operator control of the motor grader 102 by selecting an appropriate control configuration for the hydraulic drive assembly 206. The control configuration is selected based on information received from the multiple sensors coupled to the drive system 118. The sensed information may include wheel speeds and fluid pressures, or other engine operating parameters. The control configuration may be selected to avoid, for example, a negative pressure error, which means that the driving wheels 122 are overrunning the idle wheels 120 and driving the first and second hydraulic motors 218 and 220 (a condition referred to as "retarding") causing an overall loss in efficiency and drawbar force. Conversely, the control configuration may be selected to avoid, for example, a slippage condition, which means that the speed of the idle wheels 120 is greater than the speed of the driving wheels 122, which may impact operator control of the motor grader 102. In an aspect of this disclosure, the speed of the idle wheels 120 may be controlled to match the speed of the driving wheels 122.

It will be appreciated that the foregoing description provides examples of the disclosed system and method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

We claim:

1. A controller comprising:
a first sensor configured to sense a speed of a first set of wheels, the first set of wheels being coupled to an engine such that power output from the engine rotates the first set of wheels;
a second sensor configured to sense a feed pressure of a fluid within a first conduit, the first conduit connecting an output from a fluid pump to an input to at least one motor, wherein the at least one motor is coupled to a second set of wheels such that power output from the at least one motor rotates the second set of wheels;
a third sensor configured to sense a return pressure of the fluid within a second conduit, the second conduit connecting an output of the at least one motor to an input of the fluid pump;
a fourth sensor configured to sense a speed of the second set of wheels; and
a processor configured to select one of a plurality of control configurations for the fluid pump based on a ratio between the feed pressure and the return pressure, and further based on a ratio between the speed of the first set of wheels and the speed of the second set of wheels.

2. The controller of claim 1, wherein the controller is configured to generate an output signal configured to transition the fluid pump to the one of the plurality of control configurations.

3. The controller of claim 2, wherein the plurality of control configurations includes a first control configuration and a second control configuration, wherein the first control configuration is selected if the ratio of the feed pressure to the return pressure is less than a predetermined pressure ratio, and wherein the second control configuration is selected if the ratio of the speed of the first set of wheels to the speed of the second set of wheels is less than a predetermined speed ratio.

4. The controller of claim 3, wherein the feed pressure is increased by increasing a pump displacement when the first control configuration is selected, and wherein the speed of the second set of wheels is decreased by decreasing the pump displacement when the second control configuration is selected.

5. The controller of claim 3, wherein the predetermined pressure ratio is greater than a ratio of 1.0.

6. The controller of claim 1, wherein the fluid pump is a variable displacement pump.

7. The controller of claim 1, wherein the fluid is a hydraulic fluid.

8. The controller of claim 1, wherein the at least one motor includes at least one of a variable displacement motor, a fixed displacement motor, or a two speed motor.

9. The controller of claim 1, wherein a first motor of the at least one motor is coupled to first wheel of the second set of wheels and a second motor of the at least one motor is coupled to a wheel of the second set of wheels.

10. A method for controlling a speed of a vehicle, the method comprising:
sensing a speed of a first set of wheels, the first set of wheels being coupled to an engine such that power output from the engine rotates the first set of wheels;
sensing a feed pressure of a fluid within a first conduit, the first conduit connecting an output from a fluid pump to an input to an at least one motor, wherein the at least one motor is coupled to a second set of wheels such that power output from the at least one motor rotates the second set of wheels;
sensing a return pressure of the fluid within a second conduit, the second conduit connecting an output of the at least one motor to an input of the fluid pump;
sensing a speed of the second set of wheels; and
selecting a control configuration for the fluid pump based on a ratio between the feed pressure and the return pressure, and further based on a ratio between the speed of the first set of wheels and the speed of the second set of wheels.

11. The method of claim 10, further comprising:
generating an output signal to control the fluid pump to operate according to the control configuration.

12. The method of claim 11, wherein the control configuration includes a first control configuration and a second control configuration,
wherein the first control configuration is selected if the ratio of the feed pressure to the return pressure is less than a predetermined pressure ratio, and
wherein the second control configuration is selected if the ratio of the speed of the first set of wheels to the speed of the second set of wheels is below a predetermined speed ratio.

13. The method of claim 12, further comprising:
if the first control configuration is selected, increasing the feed pressure of the fluid; and
if the second control configuration is selected, decreasing the feed pressure of the fluid.

14. The method of claim 12, wherein the control configuration further includes a third control configuration, wherein the third control configuration is selected if neither the first control configuration nor the second control configuration is selected.

15. The method of claim 14, further comprising:
if the third control configuration is selected, maintaining the feed pressure of the fluid.

16. The method of claim 12, wherein the predetermined pressure ratio is greater than a ratio of 1.0.

17. A machine comprising:
an engine;
a first set of wheels coupled to an output of the engine such that power output from the engine rotates the first set of wheels;
a fluid pump coupled to the output of the engine;
at least one motor coupled to the fluid pump by a first conduit and a second conduit, the first conduit connecting an output from the fluid pump to an input to the at least one motor, and the second conduit connecting an output of the at least one motor to an input to the fluid pump;
a second set of wheels coupled to the at least one motor such that power output from the at least one motor rotates the second set of wheels; and
a controller configured to generate an output signal indicative of a control configuration to the fluid pump, the controller including:
a first sensor configured to sense a speed of the first set of wheels;
a second sensor configured to sense a feed pressure of a fluid within the first conduit;
a third sensor configured to sense a return pressure of the fluid within the second conduit;
a fourth sensor configured to sense a speed of the second set of wheels; and
a processor configured to determine the control configuration for the fluid pump based on a ratio between the feed pressure and the return pressure, and further based on a ratio between the speed of the first set of wheels and the speed of the second set of wheels.

18. The machine of claim 17, wherein the machine is a motor grader.

19. The machine of claim 17, wherein the at least one motor includes a first motor and a second motor, and wherein the second set of wheels includes a first wheel and a second wheel, the first motor being coupled to the first wheel and the second motor being coupled to the second wheel.

20. The machine of claim 17, wherein the controller is a closed loop integral controller.

* * * * *